US006852922B2

(12) United States Patent
Widman

(10) Patent No.: US 6,852,922 B2
(45) Date of Patent: Feb. 8, 2005

(54) APPARATUS AND METHOD FOR SEALING A CONDUIT

(75) Inventor: Jay E. Widman, Kingwood, TX (US)

(73) Assignee: Houston Wire & Cable Company, Houston, TX (US)

(*) Notice: Subject to any disclaimer, the term of this patent is extended or adjusted under 35 U.S.C. 154(b) by 0 days.

(21) Appl. No.: 09/904,747

(22) Filed: Jul. 13, 2001

(65) Prior Publication Data

US 2003/0010516 A1 Jan. 16, 2003

(51) Int. Cl.$^7$ ................................................ H02G 3/04
(52) U.S. Cl. .................... 174/48; 174/50; 174/21 R; 174/23 R
(58) Field of Search ............................ 174/48, 49, 50, 174/50.5, 65 R, 68.1, 76, 19, 21 R, 20, 22 R, 34, 47, 68.3, 100, 23 R; 138/109, 120, 155, 96 T; 285/333, 390, 355, 93

(56) References Cited

U.S. PATENT DOCUMENTS

| | | | |
|---|---|---|---|
| 1,135,376 A | | 4/1915 | Hooker |
| 1,824,642 A | * | 9/1931 | Uber ........................... 285/383 |
| 2,247,671 A | | 7/1941 | Tepel |
| 2,257,065 A | | 9/1941 | Olley |
| 2,424,067 A | | 7/1947 | Thoren |
| 2,460,032 A | * | 1/1949 | Risley ......................... 285/383 |
| 2,711,438 A | | 6/1955 | Bissell |
| 2,816,472 A | * | 12/1957 | Boughton .................... 285/354 |
| 2,835,722 A | | 5/1958 | Appleton |
| 3,424,853 A | * | 1/1969 | Johnson III ................. 174/65 R |
| 3,555,171 A | * | 1/1971 | Larson ..................... 174/138 F |
| 3,585,273 A | * | 6/1971 | Paul ............................ 174/65 R |
| 3,607,604 A | * | 9/1971 | Nava ........................... 174/65 R |
| 3,662,087 A | * | 5/1972 | Singletary .................. 174/65 R |
| 3,761,601 A | * | 9/1973 | Kaesser et al. ............ 174/65 R |
| 3,871,692 A | * | 3/1975 | Brownfield ................. 285/390 |
| 4,060,264 A | * | 11/1977 | Gajajiva ................. 285/148.19 |
| 4,169,967 A | * | 10/1979 | Bachle ..................... 174/65 SS |
| 4,216,349 A | | 8/1980 | Wium ........................... 174/50 |
| 4,287,386 A | * | 9/1981 | Scahill et al. .............. 174/77 R |
| 4,301,325 A | * | 11/1981 | Hutchison ................... 156/242 |
| 4,456,784 A | | 6/1984 | Klein ........................... 174/23 |
| 4,467,136 A | | 8/1984 | Wium ........................... 174/50 |
| 4,538,053 A | * | 8/1985 | Morrow et al. .......... 174/65 SS |
| 4,555,129 A | * | 11/1985 | Davlin ..................... 285/136.1 |
| 4,571,452 A | * | 2/1986 | Giubileo ................... 174/77 R |
| 4,592,574 A | * | 6/1986 | Vollmuth et al. .............. 285/31 |
| 4,640,978 A | | 2/1987 | Kilbane et al. ............... 174/23 |
| 4,733,935 A | * | 3/1988 | Gandy ........................... 385/69 |

(List continued on next page.)

FOREIGN PATENT DOCUMENTS

| | | | |
|---|---|---|---|
| DE | 3833370 A1 | 4/1990 | ............. F16L/5/02 |
| EP | 0 499 754 A1 | 8/1999 | ......... H02G/15/013 |
| JP | 11 121086 A | 4/1999 | ......... H01R/13/523 |
| WO | WO98/21798 | 5/1998 | ......... H02G/15/013 |

OTHER PUBLICATIONS

International Search Report.

*Primary Examiner*—Dean A. Reichard
*Assistant Examiner*—Angel R. Estrada
(74) *Attorney, Agent, or Firm*—Baker Botts L.L.P.

(57) ABSTRACT

An apparatus and method for sealing a conduit is provided. The apparatus includes a cylindrical housing having an inner chamber and two free running hubs disposed on opposite ends of the cylinder. The free running hubs couple to opposing ends of the conduit. A pair of neoprene membranes are provided within the free running hubs, which isolate the inside of the conduit from the inner chamber of the housing. The inner chamber is filled with a polyurethane-based epoxy sealant compound. Any air, other gases or moisture trapped within the inner chamber is released through a port in the housing, which is then sealed with a plug. The apparatus forms a hermetic seal between the inside of the conduit and the outside environment.

23 Claims, 2 Drawing Sheets

U.S. PATENT DOCUMENTS

| | | | | |
|---|---|---|---|---|
| 4,840,194 A | * | 6/1989 | Berry | 138/155 |
| 4,957,314 A | * | 9/1990 | Basile et al. | 285/355 |
| 5,037,318 A | * | 8/1991 | Robertson | 174/65 R |
| 5,051,541 A | * | 9/1991 | Bawa et al. | 174/65 SS |
| 5,243,132 A | | 9/1993 | Yarbrough | 174/52.2 |
| 5,266,742 A | | 11/1993 | Heier et al. | 174/93 |
| 5,393,104 A | * | 2/1995 | Zornow | 285/148.19 |
| 5,452,748 A | * | 9/1995 | Simmons et al. | 138/89 |
| 5,466,890 A | * | 11/1995 | Stagnitti | 174/65 R |
| 5,560,655 A | * | 10/1996 | Cameron | 184/15.2 |
| 5,580,103 A | * | 12/1996 | Hall | 285/331 |
| 5,654,526 A | * | 8/1997 | Sharp | 174/84 R |
| 5,971,035 A | * | 10/1999 | Griffioen | 138/155 |
| 6,075,204 A | * | 6/2000 | Celauro et al. | 174/17 GF |
| 6,175,487 B1 | * | 1/2001 | McCartney et al. | 174/DIG. 2 |
| 6,321,021 B1 | * | 11/2001 | Cairns et al. | 385/135 |
| 6,489,554 B1 | * | 12/2002 | Bertini et al. | 174/15.6 |

* cited by examiner

APPARATUS AND METHOD FOR SEALING A CONDUIT

FIELD OF THE INVENTION

The present invention relates generally to conduit seals, and more particularly to a conduit seal system incorporated into a conduit run, which isolates internal sections of the conduit, thus preventing the passage of vapor, gases or flames via the conduit from section to section.

BACKGROUND OF THE INVENTION TECHNOLOGY

To comply with the current National Electrical Code, conduit seals must prevent the passage of gases, vapors, or flames from one portion of an electrical installation to another when used in areas where flammable or explosive gases and vapors may be present. For this reason, hermetically sealed conduits have been developed. One method and apparatus for accomplishing this goal can be found in U.S. Pat. No. 4,640,978 issued to the Minnesota Mining and Manufacturing Company. This patent relates to a method of sealing electrical fittings by foaming in situ a removable, flame retardant, solvent resistant, substantially closed cell isocyanurate resin. The patent provides that once the conduit and conduit fitting are installed and wires threaded through the conduit, a nonflammable packing material is inserted into the fitting to prevent the flow of the resin beyond the area that needs to be sealed. The resin compound is then mixed and poured into the fitting through an opening, which is closed with a seal plug once the area to be sealed is filled with the resin compound. A drawback of this invention is that the composition contains water, which can cause the composition to swell at low temperatures and fracture the seal casing. Another drawback of this design is that the nonflammable packing material used to section off the area to be sealed is extremely difficult to insert in a manner necessary to prevent the migration of the composition into the conduit and out of the seal body.

At least one prior art conduit seal has eliminated the use of packing material to section off the area to be sealed. This device is disclosed in U.S. Pat. No. 2,247,671 issued to Tepel et al. In this device, the conduit seal is mounted on the end of the conduit and consists of three separate body-forming elements, an inner casing or coupling member, an extension or intermediate casing member, and an outer end or ring bushing member. The inner casing member is formed with an interior thread adapted to be screwed onto the threaded end of the conduit. Adjacent to the threaded portion of the inner casing and opposite the end of the conduit is an annular shoulder or abutment. Between the end of the conduit and the abutment is a soft rubber diaphragm mounted between two relatively thin annular sheet metal rings. The rubber diaphragm is formed with an opening of a diameter considerably smaller than the outside diameter of the sheath of the cable. This is so that when the cable is inserted in the opening, the rubber snugly embraces the cable in a substantially tight manner. Thus, the rubber diaphragm in this device replaces the use of the packing material. However, a drawback of this device is that it is designed as an end seal, primarily for lead sheathed cables. It is not designed to join two lengths of conduit and provide a seal that will deter the flow of gases, vapors, and flames. Also, it is not easily connectable to the conduit.

SUMMARY OF THE INVENTION

The present invention overcomes the above-identified problems as well as other shortcomings and deficiencies of existing technologies by providing an apparatus and method for sealing a conduit from gases, vapors and flames, which is not susceptible to fracturing and eliminates the necessity of stuffing packing material into difficult to reach areas with very limited visibility. This assures that the sealant remains in the seal and prevents the passages of vapors, gases, and/or flames.

In one embodiment of the present invention an apparatus for sealing the conduit is provided. The apparatus includes a housing defined by an inner chamber and outer surface. The apparatus further includes at least one free running hub disposed on, and mounted to, the housing, which is adapted for coupling to at least one end of the conduit. The apparatus also includes a flexible membrane disposed within the inner chamber of the housing, which is adjacent to the free running hub. The apparatus further includes a polyurethane-based epoxy sealant disposed within the inner chamber and means for purging any air, other gases, or moisture which may be trapped within the inner chamber. In one embodiment, the purging means includes a threaded port and corresponding threaded plug adapted to mate with the threaded port. In another embodiment, the purging means includes a valve, preferably of the spring loaded ball type. As those of ordinary skill in the art will appreciate, the purging means may include other equivalent devices.

In another embodiment of the present invention, a method of sealing a conduit using the apparatus described above is provided. The method includes the steps of coupling the apparatus to at least one end of the conduit, threading any wires or cables that may be contained within the conduit through the flexible membrane, and filling the inner chamber with the polyurethane-based epoxy sealant compound. The method also includes the step of releasing any air, other gases, or moisture which may be trapped in the inner chamber after it is filled with the polyurethane-based epoxy sealant compound.

BRIEF DESCRIPTION OF THE DRAWINGS

A more complete understanding of the present disclosure and advantages thereof may be acquired by referring to the following description taken in conjunction with the accompanying drawings wherein.

DETAILED DESCRIPTION OF THE PREFERRED EMBODIMENTS

Figure 1:
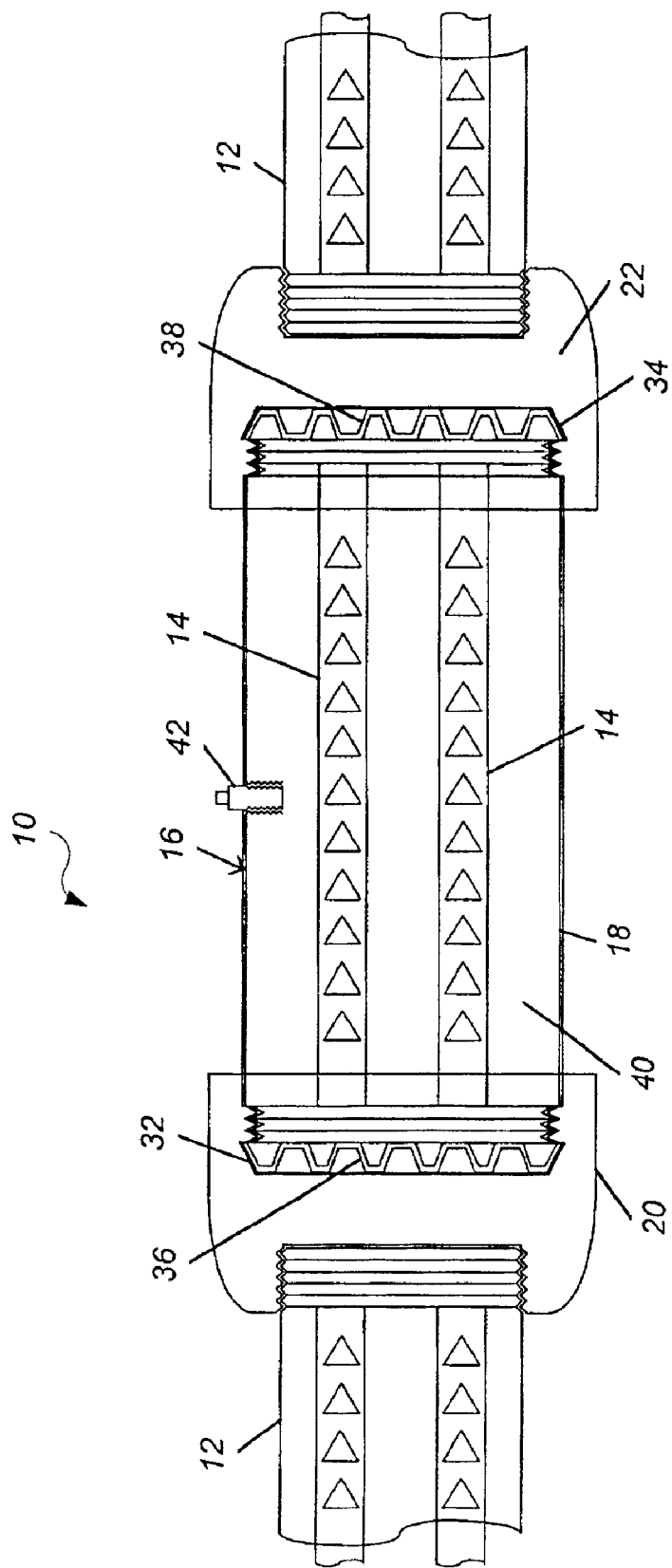
FIG. 1 is a cross-sectional view of an apparatus for sealing a conduit in accordance with the present invention.

Referring now to the drawings, the details of preferred embodiments of the invention are schematically illustrated. FIG. 1 illustrates the apparatus for sealing a conduit in accordance with the present invention. The apparatus is shown generally by reference numeral 10. The apparatus 10 couples opposing ends of a conduit 12 to each other by hermetically sealing the inside of the conduit and its contents, namely wires and/or cables 14, from the outside.

The apparatus 10 includes a housing 16, which is formed of a generally cylindrically-shaped mid-section 18, and a pair of oppositely mounted free running hubs 20 and 22. The cylindrically-shaped mid-section 18 of the housing 16 is formed of metal, preferably an aluminum alloy.

The free running hubs 20 and 22 are generally conical in shape. Female threads are formed on the inside surface of the conical portion of the hubs 20 and 22. One female thread is adapted to mate with a male thread formed at the opposing ends of the conduit 12 being joined and sealed by the apparatus 10. Another female thread is adapted to mate with a male thread formed at the opposing ends of the mid-section 18. The female and male threads are taper-tapped to match each other, and each has at least five full threads, to insure a tight seal. The taper of the threads adapted for mating the free running hubs 20 and 22 with the mid-section 18 terminates at shoulders 32 and 34, which coincide with the end of the female threads near the center of the free running hubs 20 and 22.

Disk-shaped flexible membranes 36 and 38 are placed against shoulders 32 and 34, respectively. The disk-shaped flexible membranes 36 and 38 are preferably formed of neoprene, and are preferably approximately 125 millimeters thick and approximately 0.50 to 3.50 inches in diameter, depending on the diameter of the seal necessary to match the size conduit in question. The membranes 36 and 38 have a raised surface formed of a plurality of indentations in a symmetrical pattern. The membranes 36 and 38 also have openings, in the form of slits, through which the wires/cables 14 can be accommodated. The openings in the membranes 36 and 38 are smaller than the outer diameter of the wires/cables 14 so that the membranes form an interference fit around the outer diameter of the wires/cables. This interference fit helps to hermetically seal the inside of the conduit 12 from the outside environment.

The housing 16 has an inner chamber 40, which is defined by the regions formed inside of the cylindrical mid-section 18 and inside of the tapered section of the free running hubs 20 and 22. The inner chamber 40 separates the inside of the apparatus 10 from the outside environment. The flexible membranes 36 and 38 retain the polyurethane-based epoxy sealant compound within the inner chamber 40.

A port is formed in the cylindrical mid-section 18 of the housing 16. It is threaded and adapted to mate with a threaded plug 42. The threaded plug 42 is removable and used to release any air, other gases and/or moisture trapped inside of the inner chamber 40. The threaded plug 42 is also used to open the port so that the polyurethane-based epoxy sealant compound can be injected into the chamber 40 and can be inspected.

When the inner chamber 40 is filled, the injection device is removed and the inner chamber is sealed. After the inner chamber 40 is filled, some air may be trapped in the inner chamber. This air is released by removing the threaded plug 42 as described above. As those of ordinary skill in the art will appreciate, other mechanisms may be used in place of the threaded plug 42 to fill the inner chamber 40 in the manner described.

The polyurethane-based epoxy sealant compound preferably comprises a polymer and a monomer. Furthermore, the polyurethane-based epoxy sealant compound does not allow water to migrate through the seal into the inside of the conduit 12. Therefore, the apparatus 10 does not require a drain or breather plug. However, the plug 42 can be modified to perform the function of a drain or breather plug where needed. Indeed, the threaded plug 42 can be modified to allow moisture to flow out of the inner chamber 40 at a rate of 50 cc (cubic centimeters) per minute and air to flow out at a rate of 0.2 cubic feet per minute at atmospheric pressure, by utilizing a spring-loaded ball-type valve assembly calibrated for the desired flow of air and/or moisture.

The apparatus 10 is preferably assembled as follows. First, the cylindrically-shaped mid-section 18 and free running hubs 20 and 22 are formed. The free running hubs 20 and 22 are die cast into their desired shape. The inner partially conical surface is then taper-tapped to form at least five female threads on each side, as described above. The flexible membranes 36 and 38 are also formed using conventional techniques.

Once the basic components of the device are formed, the device is ready for assembly. The flexible membranes 36 and 38 are positioned in the free running hubs 20 and 22, and more specifically, against the shoulders 32 and 34. The flexible membranes 36 and 38 are sized such that their diameters are slightly larger than the internal diameters of the free running hubs 20 and 22 so that the membranes fit snuggly within the free running hubs. The free running hubs 20 and 22 are then attached to the cylindrically-shaped mid-section 18 of the housing 16 through a male-female thread connection. As those of ordinary skill in the art will appreciate, there are a number of alternative and equivalent means of securing the mid-section 18 to the free running hubs 18.

Finally, the threaded port, or valve, 42 is formed in, and attached to, respectively, the cylindrically-shaped mid-section 18. These steps in the assembly can take place before or after assembly of the mid-section 18 and free running hubs 20 and 22. The threaded port, or valve, 42 are conventional devices, which can be manufactured using known techniques.

Figure 2:
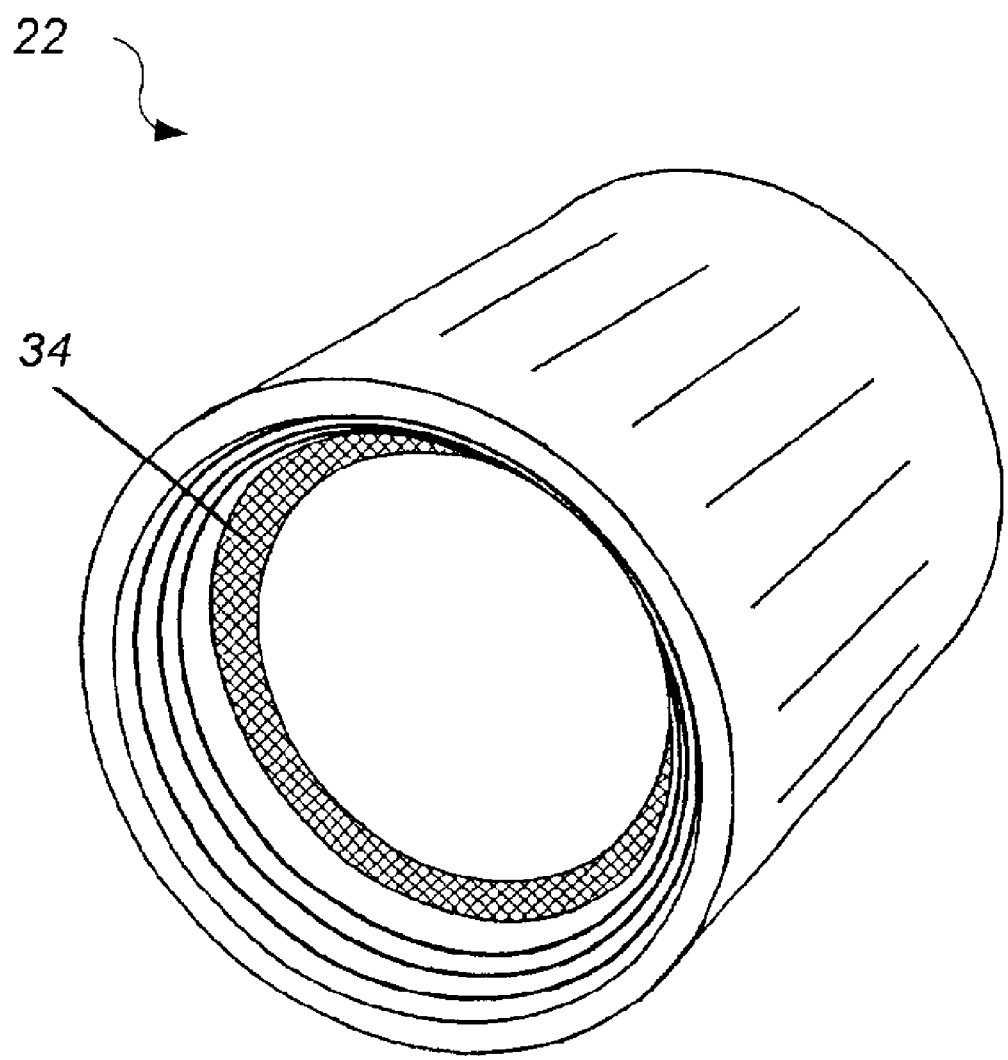
FIG. 2 is a side view of a free running hub in accordance with the present invention.

FIG. 2 illustrates a free running hub in accordance with the present invention. The female thread of the free running hub 22 adapted to mate with the mid-section (not shown) is adjacent to the shoulder 34. A flexible membrane (not shown) may be placed against the shoulder to form a seal to contain sealant compound within the mid-section.

While the present invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

What is claimed is:

1. A sealed conduit system, comprising: (a) a metal conduit having at least one end; (b) a housing having an inner chamber and an outer surface; (c) at least one free running hub coupled to said housing and the at least one end of said metal conduit; (d) a flexible membrane disposed within said at least one free running hub; and (e) a spring-loaded ball type valve adapted to purge any air, other gases or moisture, which may be trapped within the inner chamber of said housing.

2. A sealed conduit system according to claim 1, wherein the housing is defined by a mid-section, which is substantially cylindrically shaped, and two free running hubs are disposed on, and mounted to, opposite ends of the mid-section.

3. A sealed conduit system according to claim 1, further comprising a polyurethane-based epoxy sealant compound disposed within said inner chamber.

4. A sealed conduit system according to claim 3, wherein the polyurethane-based epoxy sealant compound comprises a polymer and a monomer.

5. A sealed conduit system according to claim 1, wherein the housing is formed of an aluminum alloy.

6. A sealed conduit system, comprising: (a) a metal conduit having at least one end; (b) a housing having an inner chamber and an outer surface; (c) at least one free running hub coupled to said housing and the at least one end of said metal conduit; and (d) a flexible membrane disposed within said at least one free running hub; wherein: said housing is defined by a mid-section, which is substantially cylindrically shaped, and two free running hubs are disposed on, and mounted to, opposite ends of the mid-section; and the free running hubs are partially conical in shape and have an inside surface, which has a first set of female threads formed thereon for mating with the ends of the metal conduit.

7. A sealed conduit system according to claim 6, wherein the inside surface of the free running hubs has a second set of female threads formed thereon for mating with the ends of the cylindrically-shaped mid-section and a shoulder adjacent to the second set of female threads.

8. A sealed conduit system according to claim 7, wherein a flexible membrane is disposed on the inside surface of each of the free running hubs adjacent to the shoulder.

9. A sealed conduit system according to claim 6, further comprising a polyurethane-based epoxy sealant compound disposed within said inner chamber.

10. A sealed conduit system according to claim 9, wherein the polyurethane-based epoxy sealant compound comprises a polymer and a monomer.

11. A sealed conduit system according to claim 6, wherein the housing is formed of an aluminum alloy.

12. A sealed conduit system, comprising: (a) a metal conduit having at least one end; (b) a housing having an inner chamber and an outer surface; (c) at least one free running hub coupled to said housing and the at least one end of said metal conduit; and (d) a flexible membrane disposed within said at least one free running hub; wherein the flexible membrane is generally disk-shaped, formed of neoprene and has at least one opening for accommodating one or more cables.

13. A sealed conduit system according to claim 12, wherein the housing is defined by a mid-section, which is substantially cylindrically shaped, and two free running hubs are disposed on, and mounted to, opposite ends of the mid-section.

14. A sealed conduit system according to claim 12, further comprising a polyurethane-based epoxy sealant compound disposed within said inner chamber.

15. A sealed conduit system according to claim 14, wherein the polyurethane-based epoxy sealant compound comprises a polymer and a monomer.

16. A sealed conduit system according to claim 12, wherein the housing is formed of an aluminum alloy.

17. A sealed conduit system, comprising:
(a) a metal conduit having at least one end;
(b) a housing having an inner chamber and an outer surface;
(c) at least one free running hub having an inner surface and a first and second coupling, wherein the first coupling comprises a first set of female threads formed on said inner surface for mating with the at least one end of the metal conduit and said second coupling comprises a second set of female threads formed on said inner surface for mating with an end of the housing; and
(d) a flexible membrane disposed within said at least one free running hub.

18. A sealed conduit system according to claim 17, further comprising means for purging any air, other gases or moisture, which may be trapped within the inner chamber of said housing.

19. A sealed conduit system according to claim 17, wherein the housing is defined by a mid-section, which is substantially cylindrically shaped, and two free running hubs are disposed on, and mounted to, opposite ends of the mid-section.

20. A sealed conduit system according to claim 17, wherein the flexible membrane is disposed adjacent to a shoulder formed in the inner surface of the at least one free running hub proximate said second coupling.

21. A sealed conduit system according to claim 17, further comprising a sealant compound disposed within said inner chamber, which comprises a polyurethane-based epoxy.

22. A sealed conduit system according to claim 17, wherein the flexible membrane is generally disk-shaped, formed of neoprene and has at least one opening for accommodating one or more cables.

23. A method of sealing a metal conduit, comprising the steps of: (a) coupling a sealing apparatus comprising a housing having an inner chamber and an outer surface, at least one free running hub having an inner surface, and a flexible membrane disposed within the at least one free running hub to at least one end of the metal conduit; (b) threading any wires or cables contained within said metal conduit through said flexible membrane; (c) filling the inner chamber with a polyurethane-based epoxy sealant compound; and (d) releasing, though a spring-loaded ball type valve, any air, other gases, or moisture, which may be trapped in the inner chamber after it is filled with the epoxy sealant compound.

* * * * *